Patented Feb. 5, 1929.

1,700,901

UNITED STATES PATENT OFFICE.

ANTON LEDERER, OF VIENNA, AUSTRIA.

PROCESS OF MANUFACTURING CARBON FILAMENTS.

No Drawing. Application filed August 14, 1925, Serial No. 50,281. Renewed May 18, 1928.

This invention relates to a process of manufacturing carbon filaments for incandescent electric lamps and the like, and has for its object generally the provision of a process which is efficient, economical, and lends itself readily to factory production.

More specifically, this invention has for its object an improved process of the character set forth in my co-pending application, Serial No. 692,617 filed February 13, 1924.

Other objects of the invention will in part be obvious and will in part appear hereinafter.

The invention accordingly comprises the several steps and the relation and order of one or more of such steps with respect to each of the others thereof, which will be exemplified in the process hereinafter disclosed, and the scope of the application of which will be indicated in the claims.

Although carbon and its compounds have been known for a long time, no absolutely clear knowledge of the nature of carbon has been attained beyond that relating to the well defined organic compounds. And although during the last few years much research work has been done in this direction, the statements which are available are somewhat contradictory. In general, however, three modifications of carbon are described, namely, diamond, graphite and amorphous carbon.

The so-called amorphous carbon is not, in the true sense of the word, chemically pure carbon. It contains as a rule certain impurities, particularly gaseous impurities, such as hydrogen, nitrogen and oxygen; in consequence it can never be stated with certainty whether we have carbon in the true sense of the word or a material of high carbon content. To this group of amorphous carbon belong the carbon filaments known and used until the present, and produced according to the well-known collodion process. The carbon for such filaments was derived from relatively complex molecules, and contained a relatively high percentage of impurities, such as hydrogen, nitrogen, oxygen, etc. and was by no means as dense or as stable as a crystal. Also the filaments produced from soot with binding agents, such as tar and the like, are to be regarded as amorphous carbon. Therefore the view that the carbon filaments for incandescent electric lamps produced so far are not to be looked upon as pure carbon is well justified. From the present state of the art one may conclude that the graphite modification of carbon is the most stable form of carbon except the diamond and is generally the purest form in respect to chemical behavior, particularly when graphite obtained from simple compounds is taken as the source.

Under certain circumstances, however, which will be more fully described below, it is found that the separated carbon when brought into the form of a solid solution will, under certain circumstances, particularly if it already contains certain crystals or crystal nuclei set up a crystalline growth. This phenomenon is not unknown in other substances; for example, it has been observed that if in certain salt solutions, e. g. in a supersaturated solution of common salt, a small crystal of common salt is introduced, it will begin to grow, so that in this manner a big common salt crystal may be obtained. In general it may be observed that the substance which it is intended to crystallize must have the possibility of dissolving itself. Large quantities of solvent are to be avoided; a small quantity which is just sufficient to effect solution is proper. This solution may be effected in the case of carbon with the aid of a metal such as iron and chromium when subjected to the proper temperatures. If this condition be kept in mind it is not surprising that the crystal nuclei or crystals contained in the carbon used will, with the use of a proper solvent and a proper temperature, begin to grow. The carbon used for this purpose however, should be of a high degree of purity.

It is well known that carbon as such can easily be obtained from various carbon-containing compounds. It is known also that by the incomplete combustion of illuminating gas, or of vegetable, of mineral oils, and of acetylene, carbon may be separated; this carbon, however, is classed among the species of amorphous carbon, and is generally designated "soot" or "lampblack". Such species of carbon are not suitable for the process of this invention, primarily because it is not pure carbon. A suitable form of carbon may be obtained, however, from compounds which have been selected so as to insure that the resulting product will be substantially unadulterated. The product need not be crystalline, but preferably does contain crystals or crystal nuclei which, under proper circumstances, will agglomerate into larger crystal bodies.

Simple compounds of carbon are, on the whole, the most suitable, for example carbon bisulphide ($CS_2$), carbon tetrachloride ($CCl_4$), carbon hexachloride ($CCl_6$) and other compounds of carbon with a single element.

By vaporizing such a carbon compound and pasing the vapor through a glowing tube (heated to about 700–800° C.), substantially no change will take place in the vapor, the vapor passing through the tube as it is. A small dark deposit may at times be formed at some cooler spot, but it is possible to recondense the vapor into the original body; for example, in the case of carbon bisulphide, back into the original liquid.

A reaction, however, can be made to take place in the glowing tube, if certain bodies in the nature of catalysts, are introduced, for example, pure carbon, charcoal, or compressed graphite, also certain metals, as copper; over which bodies the vapor is made to pass. The decomposition of the vapor, so passed, will begin to be observed after some little time, the action taking place at plates which are specially provided for the purpose. As the action progresses, the plates becomes covered with a deposit which may be increased by continuing the process. It appears that there is not only a thermo-chemical action taking place in this process of depositing, but some localized action is also involved (i. e. chemical action in situ) which may be designated a "topo-chemical action".

Thus a deposit is obtained upon the plates introduced into the tube, considerable quantities of deposit being obtainable if the process is carried on for sufficient time. This deposit consists chiefly of carbon but generally contains some impurities, which in the case where carbon bisulphide is used, comprises sulphur. Such sulphur, however, is apparently not chemically bound in the carbon body, since, if this body be heated in a vacuum, pure carbon is obtained without any further trace of impurities; this sulphur follows the law that free sulphur can be readily expelled in the form of a vapor, and can be later condensed at a cool spot. The carbon thus obtained is a very fine, grey powder which may be easily compressed and, by passing through a suitable press or rollers, can readily be agglomerated into large scales which are ductile and have the appearance of lead. The process of obtaining substantially pure carbon as above described is set forth and claimed in my divisional application, Serial No. 140,217, filed October 7, 1926.

To make the carbon thus obtained into crystalline filaments, it is mixed with a suitable metallic solvent for the carbon preferably metallic oxides such as oxides of iron and of chromium. In order to obtain the right mixture of the metallic oxide with carbon, it is advisable to mix the carbon with a salt of the metal which is soluble in water, such as, for example, ammonium nitrate of iron, ammonium ferric sulphate, ammonium chromium sulphate, potassium chromium sulphate and potassium ferric sulphate, which, under heat, leaves behind, according to the reaction conditions, the metal, or oxide of the metal. If the heating takes place in the open air, the metallic oxide results; if it takes place in a reducing or neutral gas, the metal will be produced. According to the substance used, a small percentage of the metal, e. g. 1%, is preferably added and calculated so that a certain excess may result which, after the elimination of the admixture, will leave behind a small metallic residue. The resulting material is afterwards preferably reduced to powder form.

In order to bring this powdered material into a plastic mass, a suitable unguent binder is added; for example about 2% of an ammoniacal-oil soap is added to the carbon and iron, preferably in the form of oleic acid and liquid ammonia whereby an oleic soap is formed. Inasmuch as ammonia-oleic soap is an excellent unguent it facilitates the squirting of filaments and serves to hold together the powdered material. The filaments are then squirted through dies in the usual manner and thereupon subjected to heat.

The heat treatment, as a matter of course, has to be long, continued, and adequate. In the present case, temperature of at least 2500° C. are required. Such temperatures may be attained by employing a closed treating chamber and passing the filament through a rather dense but by no means long spiral of a thick tungsten wire. The squirted carbon filament is moved axially through this spiral of tungsten which is heated to 2500° C. or above; but in order to avoid any chemical attack on the filament it is preferable that this be done in an inert atmosphere; for example one of pure argon. Commercial argon, however, contains certain impurities, such as nitrogen and oxygen, so that it has to be substantially perfectly purified before being used. Further it is necessary to dry it very carefully in order that it may not contain any moisture. This gas, when so prepared, is adapted to be introduced into the treating chamber where it drives out the air and substantially fills the chamber. As it continues to flow it prevents fresh air from coming in. While the filament is in this heated zone the following changes appear to take place, namely:

(1) The binding agent used, ammonia-oleic soap, will vaporize.

(2) The iron salt which was added will be decomposed by the high temperature, leaving a residue of metallic iron which will attack the material of the filament and (3) Convert it into a solid solution. The process of (4) Crystallization then sets in for which sufficient time must be given to the body, and,
(5) By the use of a relatively high temperature, the iron contained in the filament will be vaporized, so that the final filament will consist substantially of pure carbon crystals.

The conditions best suited to the crystallization process require the use of a comparatively slow speed for the filament feed at temperatures at or somewhat about 2500° C., the limit of speed being about 1 to 2 meters per hour. However, it seems possible that when using a better source of heat by which temperatures of more than 3000° C. will be obtainable, the speed may be increased. In this manner crystals of considerable length can be produced consisting of pure carbon which are substantially homogeneous, and inasmuch as carbon has the highest melting point of all known elements. (Lummer states it at more than 4000° C.), if one can speak of a melting point at all, there is thus obtained a body susceptible of being heated to a high temperature without melting or disintegrating to any material extent. It is possible to burn the filament so obtained in a vacuum at an efficiency of 0.5-0.6 watt per Hefner candle; if it is specially formed, e. g. in the form of a spiral and burned in an atmosphere which prevents disintegration of the filament, the temperature may be further increased so as to have a filament which will burn at an efficiency of 0.25-0.30 watts per Hefner candle.

The filaments of this invention have as a result substantially uniform density. They also have a relatively large capacity for withstanding the thermic strain to which they are subject while in operation.

Such crystalline filaments have a positive temperature coefficient, that is to say, under the influence of heat, its electrical resistance is increased and behaves substantially like a metal, for example, in a manner similar to a filament of tungsten or osmium. This has a certain advantage for a lamp provided with such a filament, because with increased voltage the electrical resistance increases and the passage of the electric current is rendered more difficult and destruction is prevented.

Since certain changes may be made in carrying out the above process without departing from the scope of the invention, it is intended that all matter contained in the above description shall be interpreted as illustrative and not in a limiting sense.

Having described my invention, what I claim as new and desire to secure by Letters Patent, is:

1. The process of manufacturing crystalline carbon filaments for incandescent electric lamps and the like, which comprises mixing substantially pure carbon in a finely divided state with a water soluble salt adapted to yield a metallic oxide, heating the same and adding binding material to form a plastic mass, squirting the plastic mass into filament form, and subjecting the same to a relatively high degree of heat.

2. The process of manufacturing crystalline carbon filaments for incandescent electric lamps and the like, which comprises mixing substantially pure carbon in a finely divided state with a water soluble salt of a metallic solvent for carbon, heating the mixture and adding unguent binding material to form a plastic mass, squirting the plastic mass into filament form and subjecting the same to heat of a temperature of at least 2500° C. in a substantially inert atmosphere.

3. The process of manufacturing crystalline carbon filaments for incandescent electric lamps and the like, which comprises mixing substantially pure carbon in a finely divided state with a water soluble salt of a metallic solvent for carbon, heating the mixture and adding unguent binding material to form a plastic mass, squirting the plastic mass into filament form and subjecting the same to heat of a temperature of at least 2500° C. in an atmosphere of substantially pure argon.

4. The process of manufacturing crystalline carbon filaments for incandescent electric lamps and the like, which comprises mixing substantially pure carbon in a finely divided state with a water soluble salt containing iron, heating the mixture, reducing the resultant mass to powdered form, adding unguent binding material thereto to form a plastic mass, squirting the plastic mass into filament form, and subjecting the same to heat of a temperature of at least 2500° in an inert atmosphere.

5. The process of manufacturing crystalline carbon filaments for incandescent electric lamps and the like, which comprises mixing substantially pure carbon in a finely divided state with a water soluble salt containing an oxide of iron, heating the mixture and reducing it to powdered form, adding an oleic soap as a binder to the powdered material to form a plastic mass, squirting the plastic mass into filament form, and subjecting the same to heat of a temperature of at least 2500° C. in an atmosphere of substantially pure argon.

In testimony whereof I affix my signature.

ANTON LEDERER.